United States Patent [19]

Codling

[11] Patent Number: 4,873,954
[45] Date of Patent: Oct. 17, 1989

[54] FAIL-SAFE IDLE BYPASS SYSTEM
[75] Inventor: Daryl O. Codling, Rochester, Mich.
[73] Assignee: Colt Industries Inc., New York, N.Y.
[21] Appl. No.: 224,719
[22] Filed: Jul. 27, 1988
[51] Int. Cl.[4] .................. F02D 41/22; F02D 41/16
[52] U.S. Cl. ................................ 123/339; 123/585
[58] Field of Search ............................ 123/339, 585

[56] References Cited

U.S. PATENT DOCUMENTS

| | | | |
|---|---|---|---|
| 4,356,802 | 11/1982 | Kern et al. | 123/339 |
| 4,494,517 | 1/1985 | Kratt et al. | 123/339 X |
| 4,573,441 | 3/1986 | Wietschorke et al. | 123/339 |
| 4,662,333 | 5/1987 | Martel | 123/339 |
| 4,662,334 | 5/1987 | Wietschorke et al. | 123/339 |
| 4,765,299 | 8/1988 | Wataya et al. | 123/339 X |
| 4,781,161 | 11/1988 | Sausner et al. | 123/339 |

Primary Examiner—Tony M. Argenbright
Attorney, Agent, or Firm—Walter Potoroka, Sr.

[57] ABSTRACT

The present invention is an idle bypass system including a throttle body having a longitudinal axis with a throttle plate disposed transversely to the longitudinal axis. The throttle body includes a secondary passageway having an inlet and an outlet to allow fluid flow to bypass the throttle plate when in a closed position. A motor is secured to the throttle body and cooperates with the secondary passageway for allowing a predetermined amount of fluid flow through the outlet. A solenoid-actuated valve is secured to the throttle body and cooperates with the secondary passageway for allowing a predetermined amount of fluid flow to the intake manifold when the amount of fluid flow past the motor is not within predetermined limits.

14 Claims, 2 Drawing Sheets

FAIL-SAFE IDLE BYPASS SYSTEM

BACKGROUND OF THE INVENTION

1. Field of the Invention

The present invention relates to automotive vehicles, more particularly to, fluid flow through a throttle body on an engine for automotive vehicles.

2. Description of Related Art

Currently, a throttle body on an engine has a throttle plate for controlling the amount of air that flows to the cylinders of the engine. During idle operation of the engine, air is allowed to bypass the throttle plate by flowing through passageways in the throttle body. Typically, a linear drive motor, such as a stepper motor controlled by an on-board computer or electronic control unit, is mounted on the throttle body to meter the amount of air bypassing the throttle plate.

One problem with the current system is that a failure of the stepper motor may cause the engine to surge if a high amount of bypass air flows past the throttle plate during engine idle. Also, the engine may stall if not enough bypass air is allowed to flow during engine idle.

It is, therefore, an object of the present invention to provide an idle bypass system that will allow a predetermined amount of air to flow past the throttle plate to the intake manifold if a failure of the stepper motor occurs. It is another object of the present invention to provide a low cost idle bypass system.

SUMMARY OF THE INVENTION

Accordingly, the present invention is an idle bypass system including a throttle body having a longitudinal axis with a throttle plate means disposed transversely to the longitudinal axis. The throttle body includes means forming a secondary passageway and having an inlet and an outlet to allow fluid flow to bypass the throttle plate means when in a closed position. A motor means is secured to the throttle body and cooperates with the secondary passageway for allowing a predetermined amount of fluid flow through the outlet. A solenoid-actuated valve means is secured to the throttle body and cooperates with the secondary passageway for allowing a predetermined amount of fluid flow to the intake manifold when the amount of fluid flow past the motor means is not within predetermined limits.

An advantage of the present invention is that engine surge is controlled by allowing a predetermined amount of bypass air to the intake manifold if a failure of the stepper motor occurs. Also, the present invention is mechanical in nature so that there is not total reliance on the electronics in controlling the stepper motor.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
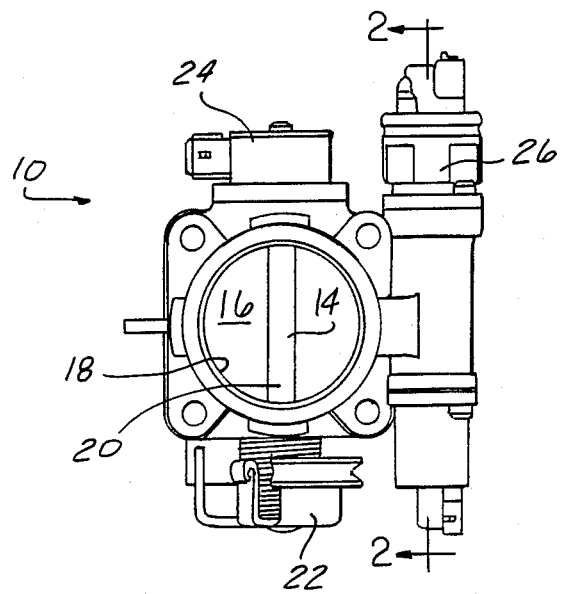
FIG. 1 is a plan view of an idle bypass system according to the present invention.

Referring to FIG. 1, an idle bypass system is generally shown at 10. The system 10 includes a throttle body 12 having a generally cylindrical shape with a longitudinal axis 14. The throttle body 12 is mounted on an engine (not shown) in a known manner. The throttle body 12 includes a throttle plate 16 disposed transversely to the longitudinal axis 14 within a primary or central passage 18 formed by the throttle body 12. The throttle plate 16 is supported by a shaft 20 for pivotal movement about the axis of the shaft 20. A biasing means 22 is disposed at one end of the shaft 20 to bias the throttle plate 16 in a closed or idle position as is commonly known in the art. A throttle plate sensing means 24 is disposed at the other end of the shaft 20 for sensing the position of the throttle plate 16 as is commonly known in the art. The sensing means 24 relays the information to an electronic control unit (not shown) for controlling the position of the throttle plate 16.

Figure 2:
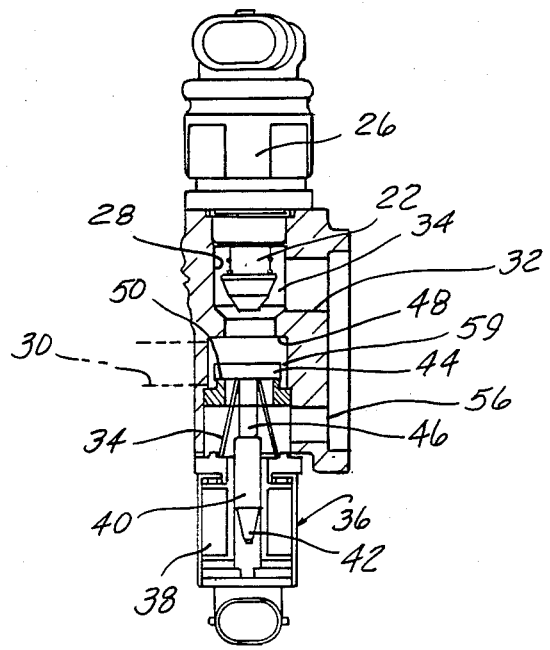
FIG. 2 is a sectional view of FIG. 1 taken along line 2—2 thereof with the solenoid energized and the valve in the energized position.
Figure 4:
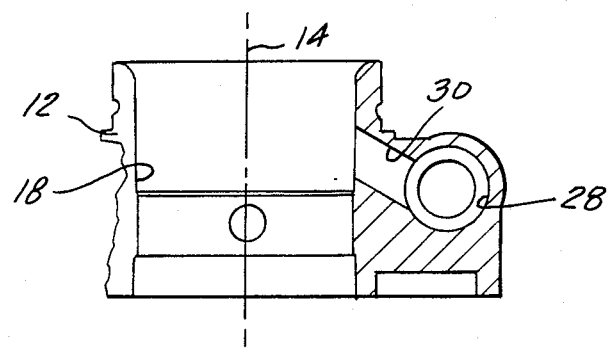
FIG. 4 is a sectional view of FIG. 3 taken along line 4—4 thereof.

Referring to FIGS. 1 and 2, a linear drive or stepper motor 26 has one end or a pintle 27 disposed in a chamber or secondary passageway 28 formed by the throttle body 12 and secured thereto in a known manner. The stepper motor 26 is controlled by the on-board computer or electronic control unit (ECU) (not shown) for metering fluid flow such as air from an inlet 30 (FIG. 4) of the secondary passageway to an outlet 32 thereof which flows to an intake manifold (not shown) of engine cylinders (not shown) downstream of the throttle plate 16. The pintle 27 of the stepper motor 26 is rotated and moved axially to open and close a seat 34 to meter the amount of air in a known manner.

Figure 3:
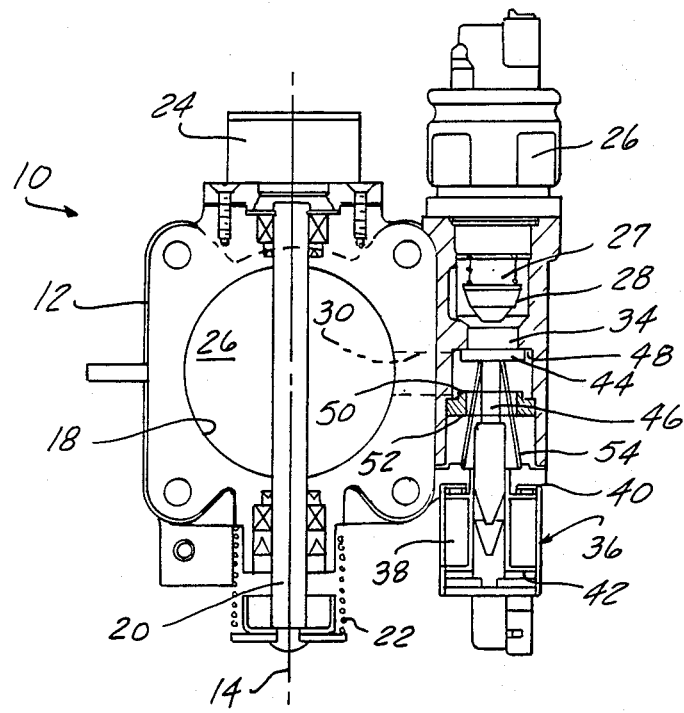
FIG. 3 is a view similar to FIG. 2 with the solenoid de-energized and the valve in the de-energized position.

The system 10 includes a solenoid-actuated valve, generally indicated at 36, disposed within the secondary passageway 28 opposite the stepper motor 26. The solenoid-actuated valve 36 comprises a coil 38 having windings for connection to a source of electrical power (not shown) such as the ECU to produce a magnetic field and a valve member 40 acting as the armature for movement in response to the presence or absence of the magnetic field. The valve member 40 is surrounded by the coil 38 partially at one end 42 and includes a valve seal 44 at the other end 46. The valve seal 44 cooperates with a first seat 48 formed by a shoulder in the secondary passageway 28 on one side of the inlet 30 and a second seat 50 formed by a seat member 52 disposed in the secondary passageway 28 on the other side of the inlet 30. The valve member 40 has a first position (FIG. 3) in which the coil is de-energized and a spring 54 biases the valve seal 44 into engagement with the first seat 48 to block air flow to the stepper motor 26 and allow air flow to bypass the stepper motor 26 and flow through a safety feed passage 56 to the intake manifold in a predetermined amount controlled by the size or diameter of the safety feed passage 56. The valve member 40 has a second position (FIG. 2) in which the coil 38 is energized, moving the valve member 40 and pulling the valve seal 44 against the force of the spring 54 into engagement with the second seat 50 to block air flow to the safety feed passage 56 and allow air flow to the stepper motor 26.

In normal operation (FIG. 2), fluid flow such as air enters through inlet 30 into the secondary passageway 28. The coil 38 of the solenoid-actuated valve 36 is energized with the valve seal 44 seated on the second seat 50. Fluid flow is metered through seat 34 by the stepper motor 26 and exits through the outlet 32 into the engine intake manifold downstream of the throttle plate 16.

For failure mode operation, if the stepper motor 26 failed to either allow enough idle air or too much idle air into outlet 32, as determined by the ECU through an oxygen sensor or the like, the ECU would de-energize the coil 38 of the solenoid-actuated valve 36 and allow the valve seal 44 to seal the first seat 48. This allows air from the secondary passageway 28 to pass through second seat 50 into the safety feed passage 56 and into the engine intake manifold. The size or diameter of the safety feed passage 56 would control idle speed per manufacturers specifications, thus preventing stalling or excessive engine R.P.M.

The present invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. An idle bypass system for allowing a predetermined amount of fluid flow to an intake manifold of an engine, said system comprising
    a throttle body having a longitudinal axis and forming a central passageway along said axis;
    throttle plate means disposed within said central passageway traversely to said longitudinal axis for rotation between an open and closed position to allow fluid flow through said central passageway;
    said throttle body including means forming a secondary passageway and having an inlet communicating with said central passageway upstream of said throttle plate means and an outlet communicating with the intake manifold downstream of said throttle plate means to allow fluid flow to bypass said throttle plate means when in said closed position;
    motor means secured to said throttle body and cooperating with said secondary passageway for allowing a predetermined amount of fluid flow through said outlet; and
    solenoid-actuated valve means secured to said throttle body and cooperating with said secondary passageway for blocking fluid flow to said motor means and allowing a predetermined amount of fluid flow to the intake manifold when the amount of fluid flow past said motor means is not within predetermined limits.

2. The invention as set forth in claim 1 wherein said throttle body includes means forming a feed passageway communicating with said secondary passageway and the intake manifold.

3. The invention as set forth in claim 2 wherein said solenoid-actuated valve comprises a coil for connection to a source of electrical power and being energized and de-energized in the presence and absence of electrical power, and a valve member moveable in response to said coil being energized and de-energized.

4. The invention as set forth in claim 3 wherein said valve member has one end partially disposed within said coil and another end including a valve seal.

5. The invention as set forth in claim 4 including means forming a first seat within said secondary passage on one side of said inlet, said valve seal cooperating with said first seat to block fluid flow to said motor means when said coil is de-energized.

6. The invention as set forth in claim 5 including a seat member disposed within said secondary passageway on the other side of said inlet and forming a second seat, said valve seal cooperating with said second seat to block fluid flow to said feed passageway.

7. The invention as set forth in claim 6 including biasing means for biasing said valve seal toward said first seat.

8. The invention as set forth in claim 7 wherein said feed passageway has a predetermined diameter to allow a predetermined amount of fluid to flow to the intake manifold.

9. An idle bypass system for allowing a predetermined amount of fluid flow to an intake manifold of an engine, said system comprising:
    a throttle body having a longitudinal axis and forming a central passageway along said axis;
    throttle plate means disposed within said central passageway traversely to said longitudinal axis for rotation between an open and closed position to allow fluid flow through said central passageway;
    said throttle body including means forming a secondary passageway and having an inlet communicating with said central passageway upstream of said throttle plate means and an outlet communicating with the intake manifold downstream of said throttle plate means to allow fluid flow to bypass said throttle plate means when in said closed position;
    motor means secured to said throttle body and cooperating with said secondary passageway for allowing a predetermined amount of fluid flow through said outlet; and
    solenoid-actuated valve means secured to said throttle body and cooperating with said secondary passageway for blocking fluid flow to said motor means and allowing a predetermined amount of fluid flow to the intake manifold when the amount of fluid flow past said motor means is not within predetermined limits;
    said throttle body includes means forming a feed passageway communicating with said secondary passageway and the intake manifold;
    said solenoid-actuated valve means comprises a coil for connection to a source of electrical power and being energized and de-energized in the presence and absence of electrical power, and a valve member moveable in response to said coil being energized and de-energized; and
    said feed passageway has a predetermined diameter to allow a predetermined amount of fluid to flow to the intake manifold.

10. The invention as set forth in claim 9 wherein said valve member has one end partially disposed within said coil and another end including a valve seal.

11. The invention as set forth in claim 10 including means forming a first seat within said secondary passageway on one side of said inlet; said valve seal cooperating with said first seat to block fluid flow to said motor means when said coil is de-energized.

12. The invention as set forth in claim 11 including a seat member disposed within said secondary passageway on the other side of said inlet and forming a second seat, said valve seal cooperating with said second seat to block fluid flow to said feed passage.

13. The invention as set forth in claim 12 including biasing means for biasing said valve seal toward said first seat when said coil is deenergized.

14. An idle bypass system for allowing a predetermined amount of fluid flow to an intake manifold of an engine, said system comprising a throttle body having a longitudinal axis and forming a central passageway along said axis;

throttle plate means disposed within said central passageway traversely to said longitudinal axis for rotation between an open and closed position to allow fluid flow through said central passageway;

said throttle body including means forming a secondary passageway and having an inlet communicating with said central passageway upstream of said throttle plate means and an outlet communicating with the intake manifold downstream of said throttle plate means to allow fluid flow to bypass said throttle plate means when in said closed position;

motor means secured to said throttle body and cooperating with said secondary passageway for allowing a predetermined amount of fluid flow through said outlet;

solenoid-actuated valve means secured to said throttle body and cooperating with said secondary passageway for blocking fluid flow to said motor means and allowing a predetermined amount of fluid flow to the intake manifold when the amount of fluid flow past said motor means is not within predetermined limits;

said throttle body includes means forming a feed passage communicating with said secondary passageway and the intake manifold;

said solenoid-actuated valve comprises a coil for connection to a source of electrical power and being energized and de-energized in the presence and absence of electrical power, and a valve member moveable in response to said coil being energized and de-energized;

said valve member has one end partially disposed within said coil and another end including a valve seal;

means forming a first seat within said secondary passage on one side of said inlet, said valve seal cooperating with said first seat to block fluid flow to said motor means when said coil is de-energized;

a seat member disposed within said secondary passageway on the other side of said inlet and forming a second seat, said valve seal cooperating with said second seat to block fluid flow to said feed passage;

biasing means for biasing said valve seal toward said first seat; and said feed passage has a predetermined diameter to allow a predetermined amount of fluid to flow to the intake manifold.

* * * * *